United States Patent [19]

Lafferty

[11] Patent Number: 5,003,894
[45] Date of Patent: Apr. 2, 1991

[54] SEEDER CLUTCH FOR TRAMLINES

[76] Inventor: James G. Lafferty, P.O. Box 7208, Fredericksburg, Va. 22404

[21] Appl. No.: 448,366

[22] Filed: Dec. 11, 1989

[51] Int. Cl.$^5$ .............................................. A01C 7/20
[52] U.S. Cl. .................................... 111/178; 111/170; 111/922; 111/900
[58] Field of Search .................. 111/178, 177, 174, 78, 111/77, 32, 34, 25, 59-62, 67, 170, 200, 900, 921, 922, 923, 927, 925; 222/368, 486; 221/185, 252, 266

[56] References Cited

U.S. PATENT DOCUMENTS

| 612,043 | 11/1898 | King ................................. 111/60 X |
| 1,134,894 | 4/1915 | Nurton ............................ 111/178 X |
| 1,840,602 | 1/1932 | Pender .................................. 222/486 |
| 2,332,743 | 10/1943 | Morris . |
| 2,661,124 | 7/1950 | Ajero . |
| 2,854,933 | 10/1958 | Kuester et al. . |
| 3,027,180 | 3/1962 | Schnell . |
| 3,053,418 | 9/1962 | Jordan . |
| 3,101,826 | 8/1963 | Jennings . |
| 3,106,998 | 10/1963 | Walker . |
| 3,113,655 | 12/1963 | Adler . |
| 3,163,333 | 12/1964 | Berry . |
| 3,648,810 | 3/1972 | Weatherby . |
| 3,982,670 | 9/1976 | Brass . |
| 3,993,227 | 11/1976 | Oettinger . |
| 4,122,974 | 10/1978 | Harbert et al. . |
| 4,137,853 | 2/1979 | Peterson . |
| 4,289,256 | 9/1981 | Bailey . |
| 4,359,952 | 11/1982 | Gesior et al. ................... 222/616 X |
| 4,373,621 | 2/1983 | Hellmer . |
| 4,408,704 | 10/1983 | Steilen . |
| 4,427,135 | 1/1984 | Mackay et al. . |
| 4,438,873 | 3/1984 | Kaercher, Jr. . |
| 4,516,670 | 5/1985 | Sorensen, Jr. . |
| 4,550,860 | 11/1985 | Weeder . |
| 4,587,909 | 5/1986 | Bailey . |
| 4,623,078 | 11/1986 | Weeder . |
| 4,774,897 | 10/1988 | Bailey . |
| 4,793,523 | 12/1988 | Bailey et al. . |
| 4,928,858 | 5/1990 | Tite ................................... 111/34 X |

FOREIGN PATENT DOCUMENTS 155684 10/1963 U.S.S.R. .
685180 9/1979 U.S.S.R. .

Primary Examiner—Danton D. DeMille
Attorney, Agent, or Firm—James C. Wray

[57] ABSTRACT

A clutching mechanism for a seed meter incorporates a spring wrapped clutch for selectively disengaging a seed meter on a seed drill in order to tramline fields for agricultural purposes. A common shaft rotates and dispenses seeds from a series of seed meters on the drill. The spring wrapped clutch of the present invention allows for disengagement of singular meters from the rotational actuation of the common shaft. The seed metering incorporates a rotatable drum which dispenses the seed as it is turned. The drum is attached to a driven element which is further attached to a spring. The spring compressibly holds a driving element attached to the rotation shaft. A selective engagement of the spring causes a decompression on the driving element and consequently, stops the rotation of the seed drum within the seed meter.

11 Claims, 3 Drawing Sheets

1

SEEDER CLUTCH FOR TRAMLINES

BACKGROUND OF THE INVENTION

Tramlines are increasingly being used in agriculture as means to provide growers a guide to mark their fields. In general, tramlines are blank rows left in the field which provide markers during spraying, fertilizing, cultivating and other operations.

The tramlines prevent waste of seed during planting and prevent plant damage by tractor wheels during operations subsequent to planting. Damaged plants may form havens for disease and may interfere with harvesting or add an inferior product, reducing the overall value of product from a field.

By guiding, spraying and fertilizing, tramlines ensure complete coverage and prevent waste of expensive chemicals and damage by double application.

Tramlines are made during seeding operations wherein the grower will cut off a single seed meter or selected meters on a seed drill, thereby simply not planting a row or rows to leave tracks evident in later stages of growth. The tramlines eliminate previous methods used by growers wherein guides, foams, flagmen, or other methods were provided to allow effective spraying of fields. Without tramlines, growers tend to miss or overlap during spraying operations. Further, the tramlines allow growers to work the field sooner after rains because of the tendency of tramlined fields to dry quicker.

Also, seed is not wasted on rows which will later be trampled by the wheels of the tractor in that the spacing of tramlines usually coincides with the spacing of the wheels of tractors.

In conventional operations seed is delivered to seed tubes by seed meters, which are arranged at the top of the tubes and at predetermined intervals below a seed bin. A drive shaft extends through all the meters, translating the shaft slide metering drums and blocking bearings to desired positions in the seed meters to control seeding rate.

A need exists for a device which will enable the conventional seeding rate adjustment, while at the same time disabling selected meters for forming tramlines.

SUMMARY OF THE INVENTION

The present invention provides a seed meter clutch for creating tramlines with seed drills. In the invention, a seed meter housing is connected to a seed bin, and a fluted seed meter drum rotates in the housing for metering the delivery of seed along a seed path in the housing between the bin and a seed tube connected to the housing. A bearing block is connected to the seed metering drum for relative rotation of the seed metering drum within the bearing block. The seed metering drum and the bearing are slidable in the housing for exposing more or less of the seed metering drum, and concurrently less or more of the blocking bearing, to the seed metering path between the seed bin and the seed tube. The bearing block has a lengthwise flange which serves to block the seed path as the drum and bearing block are slid back and forth within the housing. A seed meter shaft extends through the bearing block and through the seed metering drum.

A clutch has first and second portions respectively connected to the meter drive shaft and to the seed metering drum. The first and second portions of the clutch are selectively engagable for driving the seed metering drum with the seed meter drive shaft for moving seeds in the seed path within the seed meter housing between the seed bin and the seed tube, and disengagable for disconnecting a drive condition between the seed meter drive shaft and the seed metering drum for preventing movement of seed in the seed path in the seed meter housing between the seed bin and the seed tube.

The preferred clutch is a spring wrapped clutch. The first portion includes a bushing mounted on the shaft for driving the bushing with the shaft. A driving element is mounted on the bushing for driving the driving element with the bushing and shaft. A driving drum is connected to the driving element for turning with the shaft, bushing and driving element. A driven is element connected to the seed metering drum. A driven drum is connected to the driven element in alignment with the driving drum. A spring coil surrounds and bridges the driving drum and driven drum. The preferred wrapped spring coil is made of a helically formed flat wire. A control tab extends radially outward from one end of the helically wrapped flat wire. A collar surrounds the wire wrapped spring. A groove in the collar receives the control tab for rotating the collar with the spring and driving and driven drums in a clutch-engaged condition. A stop is connected to the collar for selectability stopping rotation of the collar and thereby tending to retard the control tab, slightly decoiling and unwrapping one of the spring ends and disengaging that end of the spring from the driving drum. Disengaging the driving connection between the clutch elements stops the seed metering drum.

The preferred driven element has a radial flange having an axially formed cylindrical connecter extending toward the seed metering drum for connecting the driven element to the seed metering drum. The driven drum extends axially opposite from the radial flange with respect to the connector cylinder. The wrapped spring has one axial end stretched around the driven drum and permanently connected to the driven drum. The collar is held on the wrapped spring between the radially extending flange on the driven element and the control tab on the spring. The preferred spring further comprises at the end of the flat wire opposite the control tab a connection tab for connecting the spring to the driven element.

The preferred driving element has a cylindrical bearing connected to the driving element and extending axially beyond the driving drum into the driven drum. A first seal on the distal end of the cylindrical bearing and a second seal positioned within the driven element and extending inward for contacting the cylindrical bearing to seal the cylindrical bearing from foreign material. The driven element and one end of the seed metering drum is supported on the cylindrical bearing.

The present invention provides a process for forming tramlines in grain fields for guiding field treatment equipment within growing grain fields. Grain is drilled in straight lines across a grain field, and tractor guiding tramlines devoid of planted grain are formed within the field during the drilling. Rotation of selected individual seed meter drums within selected individual seed meter housings is stopped, forming the tractor guiding tramlines while drilling seed.

The preferred method includes disengaging individual clutches which connect seed metering drums to a seed meter drive shafts.

The preferred disengaging clutch includes stopping rotation of individual clutch collars, unwrapping clutch springs and disengaging driving drums from driven drums.

The preferred method includes rotating the driving drum with the seed metering drive shaft and driving a seed metering drum with the driven drum.

Translating the seed meter drive shaft, the driving drum, the wrapped spring, the driven drum and the seed metering drum within the seed meter housing controls rate of seeding.

A preferred selectively clutched tramlining apparatus includes a seed meter, a rotatable shaft for moving the meter for measuring and dispensing seeds and a selective clutching means between the rotatable shaft and seed meter. The preferred seed meter further includes a housing incorporating an upper seed hopper attachment means and a lower seed tube attachment. A bearing receives the rotatable shaft.

In the preferred embodiment, a rotatable seed metering drum is complementary to the bearing. An adjustment means slides the bearing and metering drum for adjusting the rate of seed flow through the seed meter housing. The rotatable shaft has a means for driving the seed meter drum within the housing. The shaft axially rotates the seed metering drum through engagement of a selective clutch. The preferred selective clutch is a spring wrapped clutch. A driven element is fixed adjacently fixed to the seed metering drum. A driving element is fixed to the rotatable shaft. An intermediate spring engages the driven and driving elements. A clutch release collar releases the spring and disengages the driving and driven elements.

The clutching mechanism comprises an intermediate spring for engaging a driving element and a driven element where the driven and driving elements incorporate respective protruding drums approximately equal to the inner diameter of the spring. The driven element drum protrudes partially into one end of the intermediate spring, and the spring non-rotatably attaches to the driven element hub. The driving element hub partially protrudes into the opposite spring opening. The intermediate spring wraps around the driven element hub and compressibly affixes thereto, thereby providing a connection between the driving and driven elements. The spring further incorporates an upwardly protruding catch means for engaging an external collar, which incorporates a means for engaging the spring catch and a stop means for prescribing a non-rotational movement to the wrapped spring. The non-rotational movement through the collar and catch decompresses the spring wrapped around the respective driving and driven hubs and disconnects the driving and driven element attachments.

The rotary seed meter drum further incorporates an axial flute for measuring specific quantities of seed, whereby a rotation of the metering drum within the housing causes the transportation of seed from the seed hopper connection to the seed spout along a seed path as prescribed by the rotational movement of the seed metering drum.

The collar has plural radial grooves complementary to the spring catch and singular or plural externally protruding stopping means.

The driving element has an attachment to the rotational shaft whereby the shaft axially protrudes through the driving element, wrapped spring, driven element, and rotary seed meter drum, respectively. The attachment means between the shaft and the driving element is a bushing for sliding over the shaft whereby the bushing has an external surface complementary to an axial hole through the driving element; and a connection post for connecting the driving element, bushing and rotational shaft through a hole drilled therethrough.

DETAILED DESCRIPTION OF THE DRAWINGS

Figure 1:
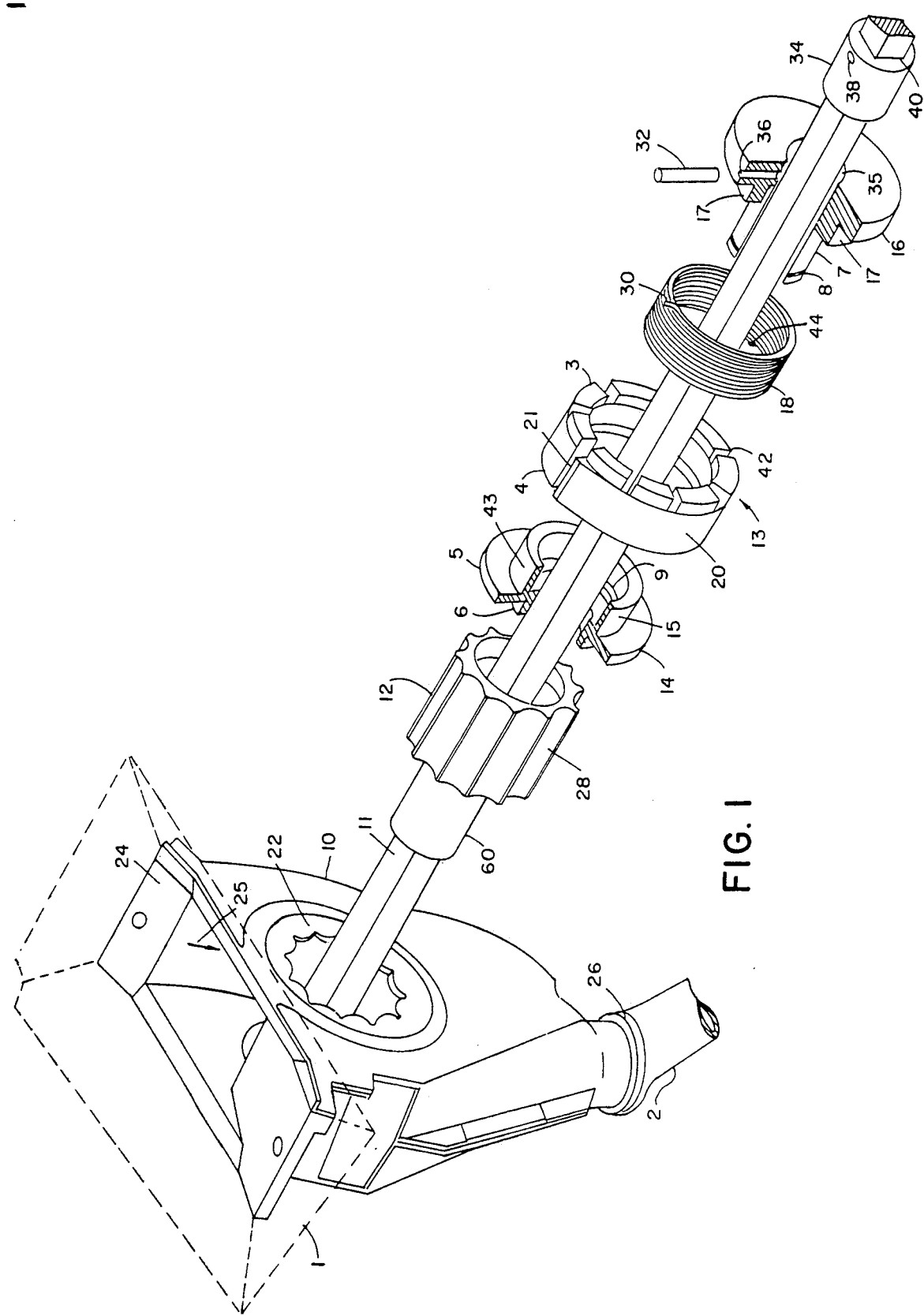
FIG. 1 is a schematic representation of a single meter in which a dispensing drum is connected to a drive shaft by a releasable clutch.

As shown in FIG. 1, the rotational movement of the seeders of the present invention is provided through use of a rotary shaft 11. Within the seed meter housing 10, the rotational movement of the seed metering drum 12 in housing drum bearing 22 causes seed to be transported from seed pin 1 through seed hopper attachment 24 to seed spout and tube attachment 26 along a seed pathway 25 within the meter to the seed tube 2. During normal seeding operations, the rotational shaft 11 causes the rotation of metering drum 12 with axial flutes 28 to dispense and meter seeds for planting. However, during tramlining operations, the selective clutch 13 is employed to disconnect the rotational movement between the shaft 11 and the seed drum 12.

The clutch incorporates a driven element 14, a driving element 16 and a helically wrapped intermediate spring 18 interposed therebetween. The driven element 14 has a driven element drum 15 and a radial flange 5. An axially formed radial connector 6 extends from axially opposite direction of that of the driven drum 15 toward the seed metering drum, for connecting the driven element to the seed metering drum 12. The driving element 16 incorporates a driving element drum 17. Extending axially therefrom is a cylindrical bearing 7 with a first seal 8. Seal 8 is a radial elevation corresponding to a second inward extending seal 9 within the driven element 15 to fixedly hold the driven element when it is engaged and to seal and protect the cylindrical baring 7 from foreign material. The driving element and driven element drums, 17 and 15, have diameters approximately equal to that of the interior diameter of the spring 18. The intermediate spring slides over and fixedly attaches to the driven element drum 15. The driving element drum 17 slides into the other side of the intermediate spring 18 whereby the spring wraps around the drum and provides a compression attachment thereto. The intermediate wrapped spring 18 thereby provides a releasable attachment between the driving element 16 and the driven element 14.

The spring 18 further has a catch 30 radially protruding from the end proximal the driving element whereby pressure applied in an angular direction counter to the wrap of the spring decompresses the spring around the driving element drum and thereby allows the free movement of the driving element drum 17 and shaft 11 driven from the spring. The seed meter is deactivated by the clutch when appropriate to provide a tramline for agricultural purposes.

To decompress the wrapped spring and thereby deactivate the seed meter, a stop 21 on a control collar 20 encompassing the spring is engaged. The engagement of the stop 21 causes a halt in the rotational movement of the collar with the shaft 11, thereby transferring the halt through radial grooves 42 on the collar which fits spring engagement 30 to retard, decompress and disengage the spring 18 from the driving element drum 17.

The driving element 16 is attached to the rotatable shaft 11 through an axial bore hole 35 drilled through the driving element and a complementary bushing 34 which fits into the bore hole. The complementary bushing further incorporates an axial bore hole 40 complementary to the shape of the shaft 11. Alternatively the driving element may be broached in the form of the shaft. The driving element incorporates a radial bore hole 36 which matches with a radial bushing bore hole 38 to receive securement post 32, thereby securing the driving element and bushing to the shaft.

In its preferred embodiment the present invention provides a method and an apparatus for selectively clutching single or plural seed meters within a series of meters on a seed drill to tramline a field. It is common for a single shaft to drive the series of seed meters, thereby evenly dispensing the seeds as described by the rotation of the shaft as shown by 40 in FIG. 1. It is the preferred object of the present invention to disengagably attach the seed drums 12 to shaft 40 within one or more seed meter housings 10 to the shaft 40. It is also preferable that the disengagable attachment is a clutching mechanism which is selectively controlled by the user, be it electronically or mechanically. The clutching mechanism 13 of the present invention is preferably a spring-wrapped clutch which transmits the rotational movement of the shaft 40 through a driving element 16 attached to the shaft to a driven element 14 attached to the seed drum 12. However, while the preferred clutching means is a spring wrapped clutch, other means for selectively transmitting the rotational movement of the shaft to the seed drum may be utilized.

It is preferable that the spring wraps around opposable axially protruding drums, 15 and 17, on the driven and driving elements 14 and 16 respectively. The spring fixedly attaches to the driven element; wherein any rotational movement or non-movement of the spring is automatically transmitted to the driven elements and consequently the seed drum 12 attached to the driven element.

The fixed attachment between the spring 18 and the driven element drum 15 preferably incorporates an inwardly radial protruding tab 44 on the spring which fits into an opening 43 on the driven element drum 15. The attachment provides a means for prescribing a movement or non-movement of the driven element through the spring.

It is preferable for the spring to be wrapped around the driving element hub 17 in such a way that the rotation of the driving element 16 causes the spring 18 to tightly wrap around the hub and compress thereon. It is further preferable for the spring to have an outwardly axially protruding catch 30 proximal the compressible engagement with the driving element hub. Engagement of the catch 30 halts the rotational movement of the spring, causing the spring to unwind and decompress on the driving element hub 17. The decompression further causes a disengagement of the driving element 16 and the spring 18.

Engagement of the spring catch 30 preferably is prescribed through a collar 20 having first portion 3 and second portion 4, for respectively connecting to the driving element 16 and the driven element 15 and thereby to the seed metering drum 12. First portion 3 has radial indentations 42 complementary to the catch 30. The collar 20 fits over the spring, further providing a function of protecting the spring and driven and driving drums from dirt. The collar 20 preferably incorporates radially protruding stops 21 which can be caught by a stationary catching means activated by the user. The stationary catching means comes down to rest upon the rotating collar at a predetermined moment and thereby, precedes to catch the stopping means and halt the rotational movement. The halt in the rotational movement of the collar causes a halt in the rotational movement of the spring which thereby prevents rotation of the driven element and, subsequently, of the seed drum. While it is known art to adjust the seed flow through the housing by sliding the seed drum partially out of the housing to thereby restrict the seed path, the present invention is an improvement in that a clutching mechanism is integral with the seed drum and allows the user to completely shut off a particular meter regardless of the rate of flow of other meters on the same seed drill. It is preferable that the integral clutch and seed drum only need a total clearance of less than 6 inches which would allow for placement of another meter in series at that point to provide for rows of less than 6 inches in spacing.

While the spring wrapped clutch of the present invention is preferable, other clutches may be used in the same fashion. For example, a clutch and pressure plate arrangement integrally disengaging the seed drum would be represented by the disclosure of this invention. The seed metering drum 12 has a protrusion 60 for protrudingly engaging within a bearing on the other end of the seed housing (as shown in FIG. 2).

Figure 2:
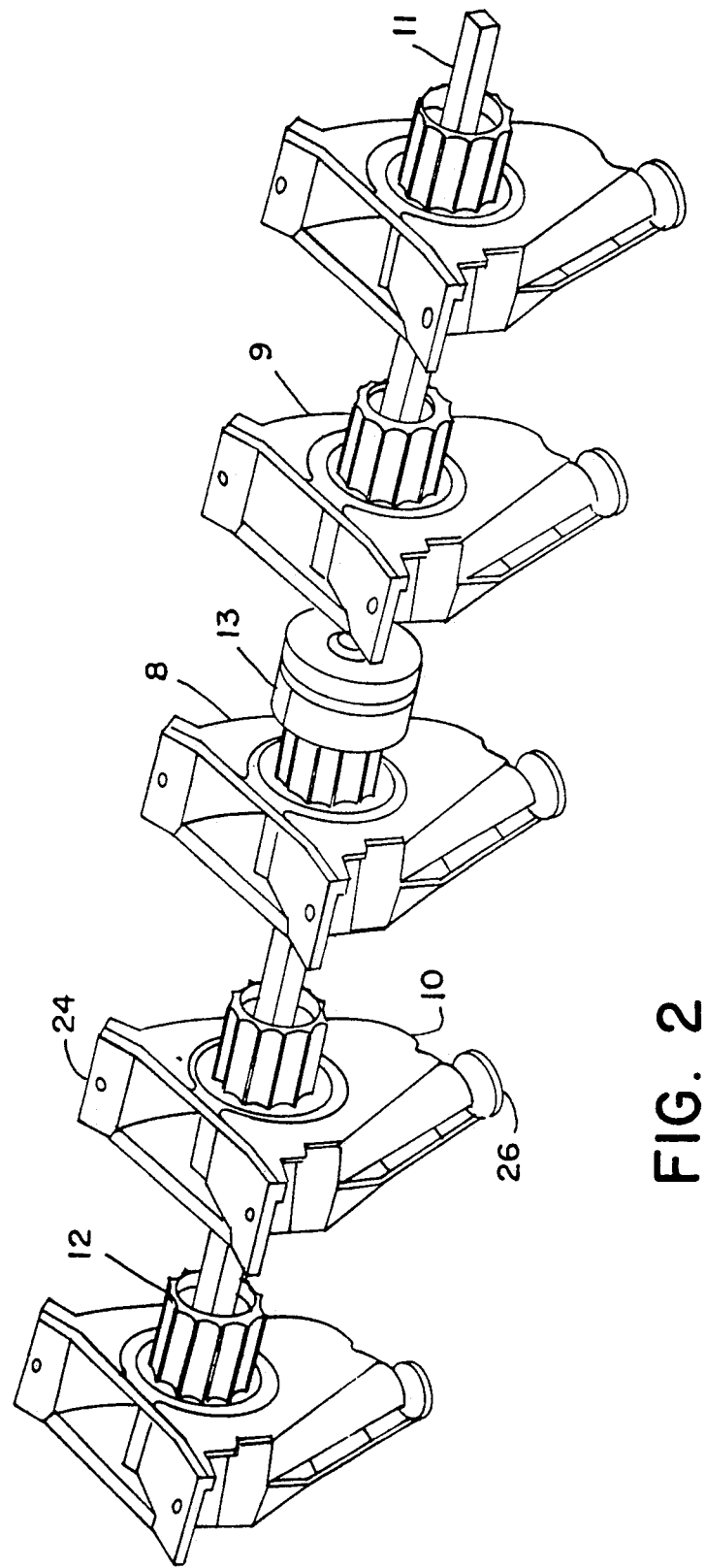
FIG. 2 is a schematic representation of a series of meters, some of which are provided with clutches to form tramlines.

As shown in FIG. 2, the selectively clutched seed meter 8 is mounted and driven by a common shaft 11 on a seed drill which turns the selectively clutched seed meter 8 in series with other seed meter 9. The series of clutched and non-clutched meters are mounted upon a seed hopper at seed hopper attachments 24 to thereby prescribe a pathway through the housing 10 to the tube attachment 26.

To tramline the field, the tramline may be automatic electrical or mechanical as well as manual, the operator engages the clutch 13 by pushing a switch to energize a solenoid and move a detent radially into contact with collar 20. As the lip 21 of collar 20 hits the detent, the collar stops, and the spring 18 opens to halt the rotation of the selectively clutched seed meter 8 while allowing the continuous rotation of the non-clutched seed meter 9. The clutch 13 can be placed singularly or in a plurality on any given combination of meters, depending on the operator's needs.

Figure 3:
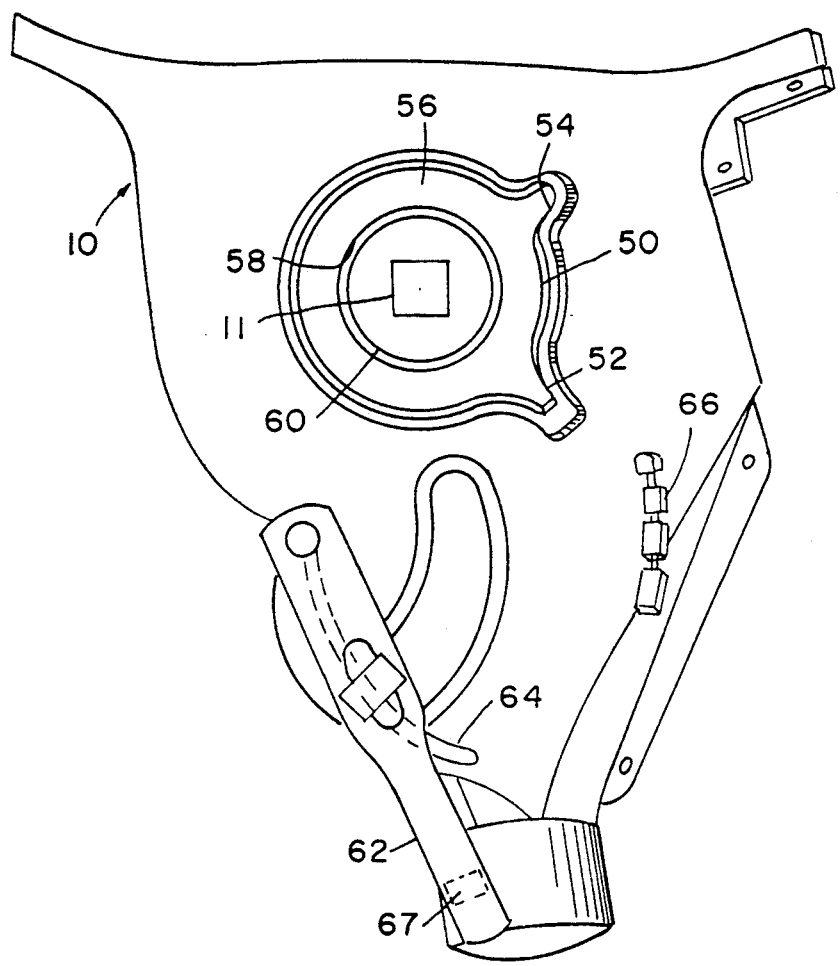
FIG. 3 is a detail of an opposite side of the seed meter showing the bearing block inserted in the housing.

Referring to FIG. 3, the seed meter 10 has an opening 50 in its side. The opening 50 has non-rotational extensions 52 and 54. A seed blocking bearing 56 fits within the opening 50 and slides back and forth within the opening as the drive shaft 11 is moved back and forth axially to control the seeding rate. The seed blocking bearing 56 has a central bore 58, which receives a protrusion 60 which is connected on the other side (as shown in FIG. 1) to the seed metering drum 12. The protrusion 60 of the seed metering drum 12 partially supports the seed metering drum within the bearing block 56.

Also shown in FIG. 3 is a regulator arm lever 62, which is attached to a curved plate 64 within the seed meter housing 10. Lever 62 is raised and lowered and has a protrusion 67 which is connected in the detent 66 to control the seed path size.

While the invention has been described with reference to a specific embodiment, modifications and variations may be constructed without departing from the scope of the invention, which is defined in the following claims.

I claim:

1. The method of forming tramlines in grain fields for guiding field treatment equipment within growing grainfields comprising drilling grain in straight lines across grainfields and forming tractor guiding tramlines devoid of planted grain within the field during the drilling by stopping rotation of selected individual seed meter drums within selected individual seed meter housings during the forming of tractor guiding tramlines while drilling seed, wherein the stopping comprises disengaging individual clutches which connect seed metering drums to a seed meter drive shaft.

2. The method of claim 1, wherein the disengaging comprises stopping rotation of individual clutch collars, unwrapping clutch springs and disengaging driving drums from driven drums.

3. The method of claim 2, further comprising driving the driving drums with the seed metering drive shaft and driving a seed metering drums with the driven drums.

4. The method of claim 3, further comprising translating the seed meter drive shaft, the driving drum, the wrapped spring, the driven drum and the seed metering drum within the seed meter housing to control rate of seeding.

5. A selectively clutched tramlining device, comprising a seed meter, a rotatable shaft for prescribing the measuring and dispensing of seeds and selective clutching means between the rotatable dispensing shaft and seed meter; said seed meter further comprising a housing incorporating an upper seed hopper attachment means and a lower seed spout, a bearing means for receiving the rotatable shaft and clutching means, a rotatable seed metering drum complementary to the bearing and an adjustment means for adjusting the rate of seeds through the seed meter housing; the rotatable shaft further comprising a means for driving the seed meter drum within the housing, wherein the shaft rotates the seed metering drum through engagement of the clutching means; the clutching means further comprising a spring wrapped clutch incorporating a driven element adjacently fixed to the seed metering drum, an opposite driving element affixed to the rotatable shaft, an intermediate spring for engagement of the driven and driving elements and a clutch release collar for releasing the clutch and disengaging the driving and driven elements.

6. The clutching mechanism of claim 5, wherein the intermediate spring comprises means for engaging a driving element and a driven element, wherein the driven and driving elements incorporate respective protruding drums approximately equal in diameter to an inner diameter of the spring; said driven element drum protruding partially into one end of the intermediate spring wherein the spring non-rotatably attaches to the driven element hub; said driving element hub partially protruding into the opposite spring opening wherein the intermediate spring wraps around the driving element hub and compressibly affixes thereto; said intermediate wrapped spring thereby providing a connection between the driving and driven elements, wherein the spring is non-rotatably affixed to the driven element and compressibly affixed to the driving element; said spring further comprising a protruding catch means proximal the driving element for engaging the release collar; the release collar incorporating a means for engaging the spring catch and a stop means for retarding rotational movement to the wrapped spring; said retarding rotational movement through the collar and catch thereby decompressing the spring wrapped around the respective driving and driven hubs and thereby disconnecting the driving and driven element attachments.

7. The collar of claim 6, further comprising plural radial grooves complementary to the spring catch and radially protruding stops for prescribing a non-rotation of movement to the driven element.

8. The driving element of claim 6, further comprising an attachment to the rotational shaft whereby the shaft axially protrudes through the driving element, wrapped spring, driven element, and rotary seed meter drum, respectively; the attachment means between the shaft and the driving element further comprising a bushing for sliding over the shaft whereby the bushing has an external surface complementary to an axial hole through the driving element; and a connection post for connecting the driving element, bushing and rotational shaft through a hole therethrough.

9. Seeder clutch apparatus for tramlines comprising a seed meter housing, a connection for connecting the seed meter housing to a seed bin, a fluted seed metering drum rotatable in the housing for metering the delivery of seed between the bin connected to the housing and a seed tube connected to the housing, a bearing block connected to the seed metering drum for relative rotation of the seed metering drum within the bearing, the seed metering drum and the bearing being slidably mounted in the housing for exposing a different amount of the seed metering drum and concurrently a different amount of the blocking bearing to a seed metering path between the seed bin and the seed tube, a seed meter drive shaft extending through the bearing and through the seed metering drum and a clutch having first and second portions respectively connected to the meter drive shaft and to the seed metering drum, the first and second portions of the clutch being selectively engagable for driving the seed metering drum with the seed meter drive shaft for moving seeds in a seed path within the seed meter housing between the seed bin and the seed tube and selectively disengagable for disconnecting a drive condition between the seed meter drive shaft and the seed metering drum for preventing movement of seed to a seed path in the seed meter housing between the seed bin and the seed tube, wherein the clutch comprises a spring wrapped clutch and wherein the first portion comprises a bushing mounted on the shaft for driving the bushing with the shaft, a driving element mounted on the bushing for driving the driving element with the bushing and shaft, a driving drum connected to the driving element for turning with the shaft, bushing and driving element, a driven element connected to the seed metering drum and a driven drum connected to the driven element in alignment with the driving drum, a spring coil surrounding and bridging the driving drum and driven drum, the spring wrapped coil being made out of a helically formed flat wire, a control tab extending radially from one end of the helically wrapped flat wire, a collar surrounding the wire wrapped spring and a groove in the collar for receiving the control tap for rotating the collar with the spring and driving and driven drums in a clutch engaged condition, a stop connected to the collar for selectably stopping rotation of the collar and thereby attending to retard the control tap and slightly decoiling and unwrapping one end of the spring and disengaging that end of the spring from the driving or driven drum and disengaging the driving connection between the clutch elements for stopping the seed metering drum.

10. The apparatus of claim 9, wherein the driven element comprises a radial flange having an axially formed radial connecter extending toward the seed metering drum for connecting the driven element to the seed metering drum and having the driven drum extending axially opposite from the radial flange with respect to the connector cylinder and wherein the wrapped spring has one axial end stretched around the driven drum and permanently connected to the driven drum and wherein the collar is held on the wrapped spring between the radially extending flange on the driven element and the control tab on the spring and wherein the spring further comprises at the end of the flat wire opposite the control tab a connection tab for connecting the spring to the driven element.

11. The apparatus of claim 9, wherein the driving element comprises a cylindrical bearing connected to the driving element and extending axially from the driving drum into the driven drum and a first seal on the disalignment of the cylindrical bearing and a second seal positioned within the driven element and extending inward for contacting the cylindrical bearing for sealing the cylindrical bearing from foreign material and for supporting the driven element at one end of the seed metering drum on the cylindrical bearing.

* * * * *